Aug. 23, 1966 R. B. TACKABERRY 3,268,719
CONDENSER SYSTEM FOR LIGHT SOURCES
Original Filed Feb. 15, 1961

INVENTOR.
ROBERT B. TACKABERRY
BY
Beau, Brooks, Buckley & Beau.

United States Patent Office 3,268,719
Patented August 23, 1966

3,268,719
CONDENSER SYSTEM FOR LIGHT SOURCES
Robert B. Tackaberry, Tonawanda, N.Y., assignor to American Optical Company, Southbridge, Mass.
Continuation of abandoned application Ser. No. 89,578, Feb. 15, 1961. This application Aug. 28, 1964, Ser. No. 402,046
5 Claims. (Cl. 240—41.3)

This application is a continuation of my copending application Serial No. 89,578, filed February 15, 1961 and now abandoned. This invention relates to illuminating means particularly for use in conjunction with optical systems and pertains more specifically to means whereby illumination and the uniformity thereof are increased by projecting an image of the source upon or adjacent to the original source whereby the cumulative effect of the source and its image serves to increase the illumination characteristics of the source alone.

Optical systems in particular frequently require illumination from relatively powerful light sources. One of the limitations of the light sources for such systems is the temperature of the source which operates as a limiting value to the intensity of illumination which may be achieved. It is of primary concern in connection with the present invention to provide means whereby a source of illumination may be intensified without materially affecting the temperature consideration, thereby obviating undesirable temperature rise effects and in general maintaining the resultant temperature rise to a relatively small value.

Another object of this invention is to provide a system for light sources wherein the illumination is intensified by superposing on the original source one or more images of the source at chosen orientations relative thereto and preferably at an orientation differing from the orientation of the source so as to minimize temperature rise effects.

Figure 2:
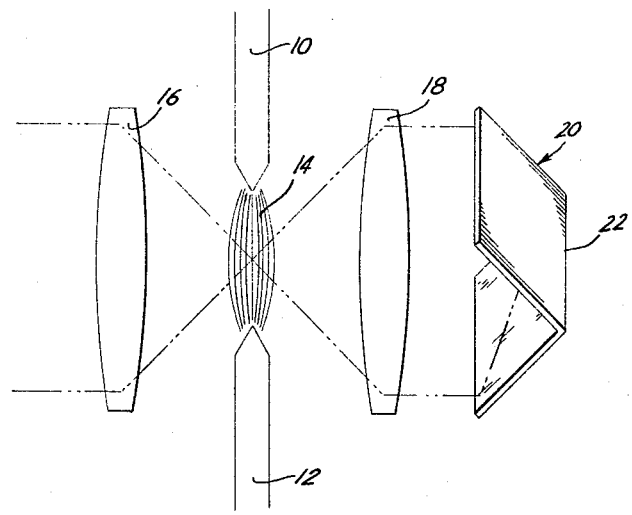
FIG. 2 is a diagrammatic view illustrating a system in accordance with the present invention producing the effect illustrated in FIG. 1.

Referring now more particularly to FIG. 2, a pair of electrodes 10 and 12 are illustrated and which are disposed in spaced relationship with each other for the production of a gaseous arc 14 thereby. This arc represents the original light source but it is to be understood that the present invention is not necessarily limited to this particular type of original source illuminating means and many types of light sources may be utilized in conjunction with the system of the present invention.

The condenser system incorporates a first lens 16 so that all light leaving the arc area is imaged to the left as illustrated. The system also incorporates a secondary lens 18 effective to image the arc at infinity to be projected upon the reflecting means indicated generally by the reference character 20. The reflecting means 20 in turn superposes an image of the arc substantially at or adjacent to the plane containing the arc 14.

Figure 1:
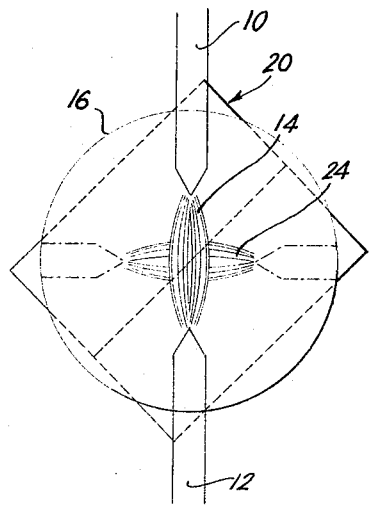
FIG. 1 is a diagrammatic view illustrating the principles of the present invention and showing an original source and its image superposed thereon at an orientation 90° from the original.

The reflecting means 20 may take any desired shape or form but in a preferred embodiment, this means is in the form of a roof mirror whose apex 22 is oriented at 45° to the axis of the arc 14 to thereby produce an image in the arc plane which is rotated 90° relative to the axis of the arc. In FIG. 1, this perpendicularly oriented arc image is designated by the reference character 24 and it will be appreciated that the resultant illumination for the system is substantially equivalent to two similar arc sources. However, the rotation of the arc image 24 effects not only a greater uniformity in the source as projected through the lens 16 but also, due to the reorientation effect, it increases illumination intensity without giving rise to undesirable temperature increases.

It will be apreciated that the reflecting means 20 need not take the specific form as shown in FIG. 2 but may utilize roof angles other than 90° as shown to produce image distortions and/or the reflecting means could be in the form of multiple roof reflector means to produce multiple secondary images at different orientations from each other and from the source.

Whereas only one form of the invention has been illustrated and described in detail hereinabove, it will be understood that various changes may be made therein without departing from the spirit of the invention or the scope of the following claims.

I claim:
1. An illuminating system comprising
a light source,
a pair of axially aligned lenses having said source located therebetween, the first of said lenses being positioned to image said light source in one direction, the second of said lenses being positioned to image said light source at infinity in the opposite direction,
and reflecting means associated with said second lens for reflecting a reoriented image back through said second lens,
said light source being in the form of a pair of spaced electrodes forming an arc therebetween,
said reflecting means being in the form of a mirror having two reflecting surfaces intersecting at right angles, the apex of said mirror being disposed parallel to a plane containing said electrodes but at an angle of 45° with respect to the path of said arc.
2. An illuminating system comprising, in combination,
lens means for imaging a light source for illumination purposes,
an elongate light source disposed in the object plane of said lens means,
and reflecting means for imaging said light source in said object plane and toward said lens means at an orientation minimizing overlap between such image and said light source.
3. An illuminating system comprising, in combination,
lens means for imaging a light source for illumination purposes,
a light source disposed in the object plane of said lens means and being elongate in a direction normal to the axis of said lens means,
and reflecting means for imaging said light source in said object plane and toward said lens means at an orientation which is substantially at right angles with respect to said light source.
4. An illuminating system comprising, in combination,
an elongate light source,
a pair of axially aligned lenses having said light source located therebetween, one of said lenses being positioned to image said light source in one direction, the other of said lenses being positioned to image said light source at infinity in the opposite direction,
and reflecting means associated with said other lens for reflecting the image of the light source back through said other lens at an orientation minimizing overlap between such reflected image and the light source.

5. An illuminating system comprising, in combination, an elongate light source,
means for superposing on said light source at least one image thereof at an orientation minimizing overlap between such image and the light source,
and means for imaging said light source and said superposed image in a predetermined direction.

References Cited by the Examiner
UNITED STATES PATENTS

| | | | |
|---|---|---|---|
| 237,095 | 2/1881 | De Lan | 240—41.3 X |
| 2,789,245 | 4/1957 | Strong et al. | 240—103 X |

NORTON ANSHER, *Primary Examiner.*

C. C. LOGAN, *Assistant Examiner.*